United States Patent
Chafer et al.

(10) Patent No.: US 10,922,682 B2
(45) Date of Patent: Feb. 16, 2021

(54) JAVA CARD APPLICATION MEMORY FOOTPRINT OPTIMIZATION

(71) Applicant: GEMALTO SA, Meudon (FR)

(72) Inventors: Sylvain Chafer, Meudon (FR); Valentin Favreau, Meudon (FR); Chandra Gondowisito, Meudon (FR); Guillaume Phan, Meudon (FR)

(73) Assignee: THALES DIS FRANCE SA, Meudon (FR)

(*) Notice: Subject to any disclaimer, the term of this patent is extended or adjusted under 35 U.S.C. 154(b) by 62 days.

(21) Appl. No.: 16/327,271

(22) PCT Filed: Sep. 4, 2017

(86) PCT No.: PCT/EP2017/072068
§ 371 (c)(1),
(2) Date: Feb. 21, 2019

(87) PCT Pub. No.: WO2018/042029
PCT Pub. Date: Mar. 8, 2018

(65) Prior Publication Data
US 2019/0213042 A1    Jul. 11, 2019

(30) Foreign Application Priority Data
Sep. 2, 2016   (EP) .................... 16306105

(51) Int. Cl.
*G06F 9/46*    (2006.01)
*G06Q 20/34*   (2012.01)
(Continued)

(52) U.S. Cl.
CPC ....... *G06Q 20/355* (2013.01); *G06F 9/44505* (2013.01); *G06F 9/468* (2013.01);
(Continued)

(58) Field of Classification Search
CPC ............ G06Q 20/3227; G06Q 20/341; G06Q 20/367; G06Q 20/355; G06Q 20/34;
(Continued)

(56) References Cited

U.S. PATENT DOCUMENTS 6,233,683 B1    5/2001  Chan et al.
7,278,582 B1 *  10/2007 Siegel .................... G06F 21/72
                                                    235/451
(Continued)

FOREIGN PATENT DOCUMENTS

EP    1873728 A1    1/2008
EP    1936574 A1    6/2008

OTHER PUBLICATIONS

PCT/EP2017/072068, International Search Report, dated Oct. 5, 2017, European Patent Office, P.B. 5818 Patentlaan 2 NL—2280 HV Rijswijk.
(Continued)

*Primary Examiner* — Tuan A Vu
(74) *Attorney, Agent, or Firm* — The Jansson Firm; Pehr B. Jansson

(57) ABSTRACT

There is described a method for Java Card application memory footprint optimization which relies on the separation in advance of the code related to the personalization from the rest of the code. It allows this code to perform the personalization of an application installed from a main package while being itself included and installed from a separated package dedicated to the personalization, namely the Card Personalization Specifications (CPS) package. This way, the CPS package and all the code inherent to the personalization can be removed once all the personalization steps have been completed.

18 Claims, 2 Drawing Sheets

(51) Int. Cl.
*G06F 9/445* (2018.01)
*G06F 21/77* (2013.01)
*G06Q 20/36* (2012.01)
*G06F 9/50* (2006.01)
*G07F 7/10* (2006.01)

(52) U.S. Cl.
CPC ............ *G06F 9/5016* (2013.01); *G06F 21/77* (2013.01); *G06Q 20/34* (2013.01); *G06Q 20/3563* (2013.01); *G06Q 20/3672* (2013.01); *G07F 7/1008* (2013.01)

(58) Field of Classification Search
CPC ............ G06Q 20/3265; G06Q 20/3672; G07F 7/1008; G06F 21/72; G06F 21/77; G06F 9/44505; G06F 9/468; G06F 9/5016
See application file for complete search history.

(56) References Cited

U.S. PATENT DOCUMENTS

| 8,196,131 | B1* | 6/2012 | von Behren | G06Q 20/367 |
| | | | | 705/64 |
| 2005/0184163 | A1* | 8/2005 | de Jong | G06Q 20/341 |
| | | | | 235/492 |
| 2008/0268811 | A1* | 10/2008 | Beenau | G06Q 20/3227 |
| | | | | 455/406 |
| 2010/0077392 | A1* | 3/2010 | Soh | G07F 7/1008 |
| | | | | 717/174 |
| 2011/0126183 | A1 | 5/2011 | Bernard et al. | |

OTHER PUBLICATIONS

PCT/EP2017/072068, Written Opinion of the International Searching Authority, dated Oct. 5, 2017, European Patent Office, D-80298 Munich.
EMVCO: "EMV Card Personalization Specification Version 1.1", EMVCO, (Jul. 1, 2007), XP002563128, Retrieved from the Internet: URL:http://www.emvco.com/specifications.aspx?id=20 [retrieved on Jan. 11, 2010].
PCT/EP2017/072000, International Search Report, dated Oct. 11, 2017, European Patent Office, P.B. 5818 Patentlaan 2 NL—2280 HV Rijswijk.
PCT/EP2017/072000, Written Opinion of the International Searching Authority, dated Oct. 11, 2017, European Patent Dffice,D-80298.

* cited by examiner

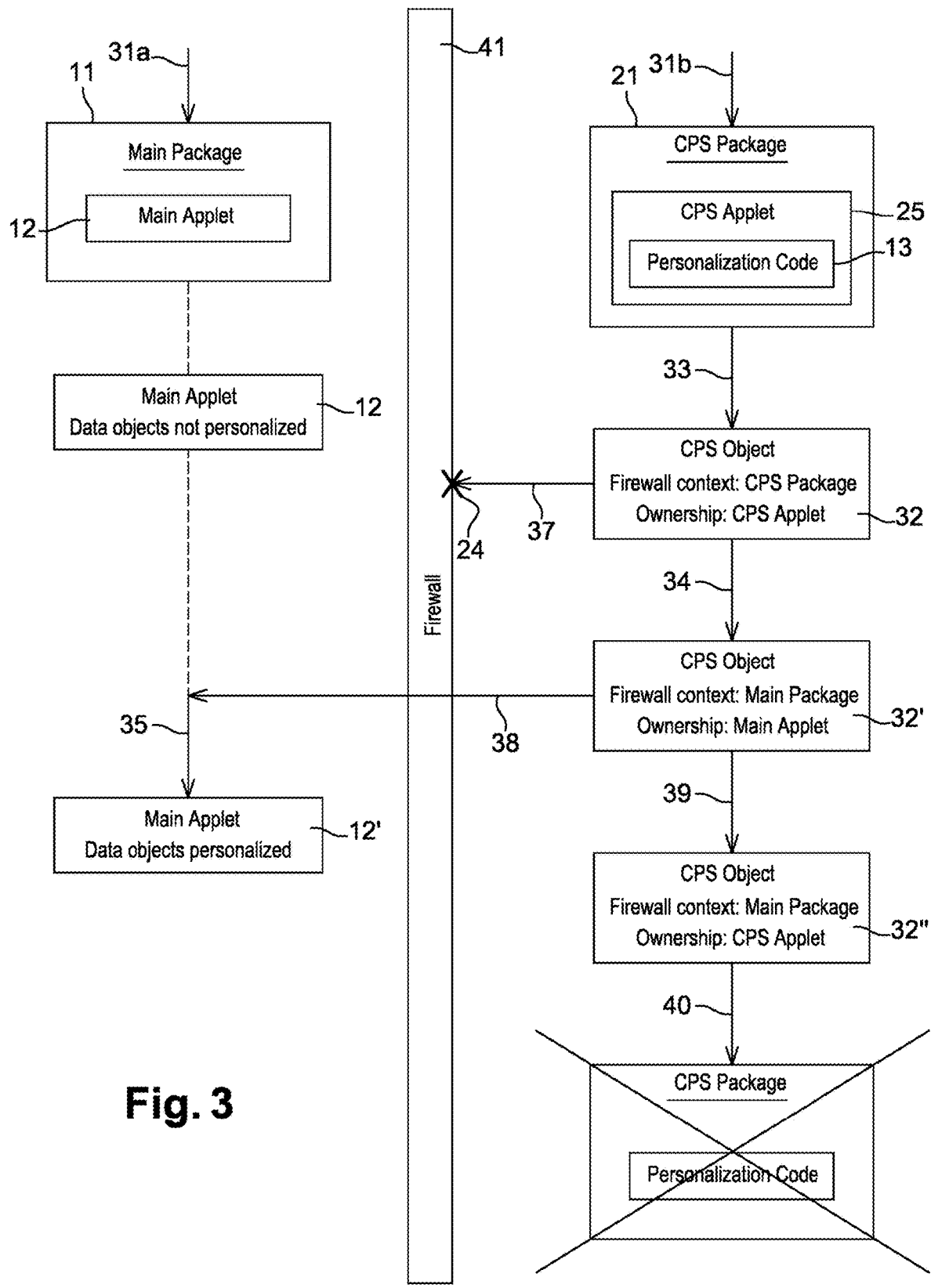

JAVA CARD APPLICATION MEMORY FOOTPRINT OPTIMIZATION

TECHNICAL FIELD

The present invention relates to a method for Java Card application memory footprint optimization.

It finds applications, in particular, in smart card products for which there is a trend of storing ever growing numbers of applications (applets) despite limited memory resources.

RELATED ART

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Java Card technology was introduced in 1996 and is now widely used in the smart card domain (notably for SIM cards or ATM cards). It allows java-based applications (applets) to run on smart cards and other similar devices which have limited memory resources. These applications usually do not have large memory footprint when taken individually. However, since the market tends to demand storing more and more of these applications on single java cards, it urges researchers to seek after solutions for reducing the memory space consumed by each application.

The different approaches considered so far all involve modifying the application code itself to reduce its memory footprint. The optimization of the code can be performed by hand, by refactoring byte code or by using a proprietary byte code in order to reduce the memory footprint. However, such optimization is set to be limited in terms of efficiency, and the memory footprint reduction currently achieved this way is non substantial. This calls for new ways of implementing a reduction of the memory space required for storing applications.

An alternative approach can be based, according to embodiments of the present invention, on the observation that once an application has been configured, the binary code implementing the personalization of this application becomes useless and yet is still using some memory space on the card. The idea behind the invention is then to eventually remove at least part of the binary code associated with the personalization of a Java Card applet to free memory space.

SUMMARY

To achieve this goal, the present invention proposes a method for the optimization of the memory footprint of a Java Card application which allows to reduce an applet memory footprint by removing some or all of the code associated to its personalization once said personalization is complete.

More specifically, according to a first aspect there is proposed a method of reducing the memory footprint of a Java Card Application comprising loading (31a,31b) two distinct packages into the memory of a Java Card, namely a first, main package (11) containing a main application and dedicated to the installation and transaction phase of said main application in the Java Card, and a second package, capable of sharing resources with the main package and intended to be used during execution of the personalization phase of the main application and to be deleted after said execution of said main application.

The above method ultimately allows removing the binary code associated with the personalization of a Java Card applet once all the steps associated to its personalization have been completed. Consequently, it allows reducing the memory footprint associated to this application on the card.

The proposed method thus relies on the separation in advance of the code related to the personalization from the rest of the code. It allows this code to perform the personalization of an application installed from a main package while being itself included and installed from a separated package dedicated to the personalization, namely the Card Personalization Specifications (CPS) package, for instance. This way, the CPS package and all the code inherent to the personalization (referred to by "the personalization code" in what follows) can be removed once all the personalization steps have been completed.

Stated otherwise, the method makes it possible to overcome limitations set by runtime rules of Java Card which are implemented by a firewall to protect applets by preventing an applet instance of accessing objects created in a different applet package. To do so, embodiments of the method of the present invention can comprise modifying the firewall context of an object created by an instance, namely the CPS applet, contained in the CPS package. By assigning to the object created from the CPS applet (called the CPS object in the following) the same firewall context as the main applet, embodiments of the method can allow the personalization code contained in the CPS object to access the main applet and to execute the code required by the personalization of the application without being blocked by the firewall.

Additional to this, embodiments of the method can further comprise making the objects created during the personalization process belong to the main applet. These objects would otherwise belong to the CPS applet since they have been created from it. In such configuration they would then be removed along with said CPS package if this package were to be removed. By introducing some modifications of the ownership of the CPS object created from the CPS applet of the CPS package, embodiments of the method overcome this limitation. The ownership of the CPS object can be changed back and forth from CPS applet to main applet and reciprocally so that once the personalization is complete, the CPS object belongs to the CPS applet instance and can be removed along with said CPS package whereas all objects personalized within the main applet still belong to the main applet.

In embodiments of the method, taken either alone or in combination:
- the main package and the second package can use Java Card Shareable Interface to be capable of sharing resources with each other;
- the main package can be associated to a transaction phase and the second package is associated to a personalization phase, respectively;
- the second package is a Card Personalization Specification, CPS, package associated to the personalization phase, said CPS package containing a CPS applet dedicated to the creation of a CPS object into the memory of the Java Card,
- the CPS package can have a firewall context and an ownership, and be configured to execute a personalization code used for the personalization of the main application;
- the method can further comprise changing the firewall context of the CPS object by assigning thereto a firewall context of the main applet and changing the ownership of the CPS object from the CPS applet instance ownership to a main applet instance ownership;

the method can further comprise handling the personalization of the main application by having the main application access the CPS object and execute the personalization code which initializes main application data.

the method can further comprise:

changing back the ownership of the CPS object from the main applet ownership to the CPS applet ownership; and, deleting the CPS package;

the firewall context of the CPS object is changed by a first Application Programming Interface, API;

the ownership of the CPS object is changed and/or changed back by the first API, or by a second API distinct from said first API;

the first API and/or the second API, is used for changing the ownership and/or the firewall context of the CPS object, respectively, are provided by the Java Card platform or are created specifically;

the first API and/or the second API used for changing the ownership and the firewall context of the CPS object can be deleted from the Java Card memory after the change back of the CPS object ownership from the main applet to the CPS applet has been performed;

in a variant, the first API and/or the second API used for changing the ownership and the firewall context of the CPS object can be rendered unusable after having performed the change back of the CPS object ownership from the main applet to the CPS applet;

the firewall context of the CPS object is changed by implementing a specific parameter in the standard install command used to install the CPS applet and defined by the Global Platform Card specification;

the main application that is installed from the main package is a Europay Mastercard Visa (EMV) application;

the main package is loaded into the Read-Only Memory (ROM) of the Java Card;

in a variant, the CPS package is loaded into the Non Volatile Memory (NVM) of the Java Card; and, finally, the method can further comprise dividing the Java Card application into the main package and the second package.

A second aspect of the invention relates to a computer program product comprising one or more stored sequences of instructions that are accessible to a processor and which, when executed by the processor, cause the processor to perform the steps of a method according to the first aspect.

Finally, a third aspect of the invention proposes a device for reducing the memory footprint of a Java Card Application, comprising means for carrying out all the steps of the method according to the first aspect or any one of the above embodiments of said method.

BRIEF DESCRIPTION OF THE DRAWINGS

Embodiments of the present invention are illustrated by way of example, and not by way of limitation, in the figures of the accompanying drawings, in which like reference numerals refer to similar elements and in which.

DESCRIPTION OF PREFERRED EMBODIMENTS

Figure 1:
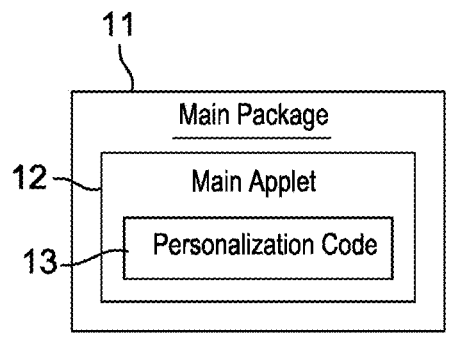
FIG. 1 is a schematic diagram showing a basic configuration for the installation of a Java Card applet structure according to the prior art.

Referring first to FIG. 1, there is shown therein a schematic description of a basic configuration for the installation of a Java Card applet structure according to the prior art.

A single package, which shall be referred to as the main package 11 in what follows, contains all the elements required for the installation and the functionalities of an application, hereinafter referred to as the main applet 12. This main applet 12 can be, for instance, a Europay Mastercard Visa (EMV) application. In the context of the invention, such an application is intended to be created/installed on the Java Card. To that end, the main package 11 is loaded onto the Java Card and is executed therein.

Some code 13 contained in the main applet 12 is dedicated to the personalization of said main applet 12. This personalization code 13 is then also contained in the main package. Said code 13 is adapted to create the main applet data objects (such as instances of classes or array types) and it is further adapted to initialize the values of each field of each data object during the personalization process of the main applet. This is referred to as the "personalization phase" in what follows.

Figure 2:
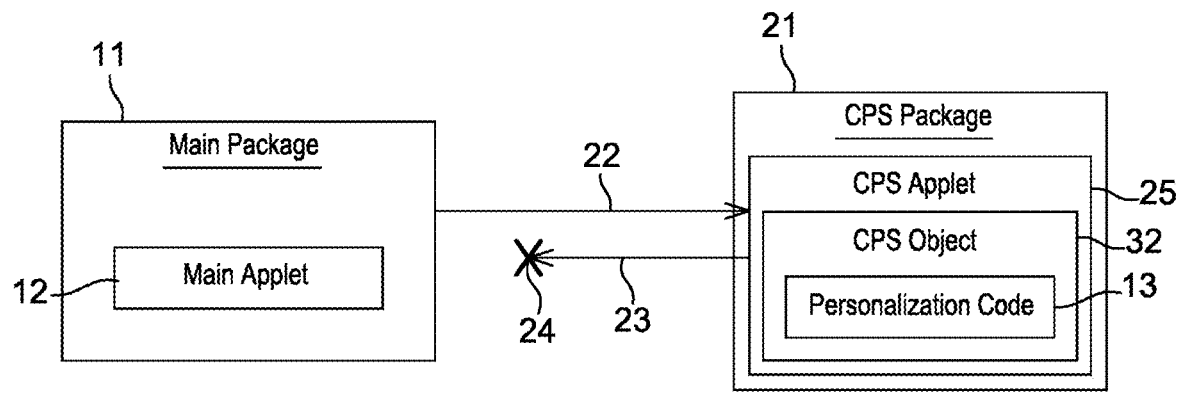
FIG. 2 is a schematic diagram illustrating the technical problem solved by the invention; and, FIG. 3 is a composite block diagram and flow chart illustrating steps carried out for the implementation of embodiments of the proposed method for Java Card application memory footprint optimization.

Referring now to FIG. 2, there is shown therein a schematic description of a configuration according to embodiments, wherein the package for the installation of the Java Card applet is split into two distinct applet packages: a main package 11 and a Card Personalization Specification (CPS) package 21.

Embodiments can, for instance, rely on the implementation of a multi-package design with different packages able to share and link their resources. A way to achieve this functional association between the main package 11 containing the main applet 12 and the CPS package 21 containing a CPS applet 25 so as to allow the above resource sharing, can be to use Java Card Shareable Interface. This way, Shareable Interface Objects (SIO) of an applet instance in a package can be accessed from another applet instance in another package. In particular, a CPS object instance 32 created by the CPS applet 25 and containing the personalization code 13 can be requested by the main applet instance 12 once said main applet instance 12 has been created.

The arrow 22 which is to be seen in FIG. 2 illustrates that last fact. The main applet instance 12 created from the main package calls for the personalization code 13 included in the CPS object 32 in the CPS package. The arrow 23 and the cross 24 illustrate that the personalization code cannot access the main applet instance 12 due to a Java Card firewall. Indeed, the Java Card firewall prohibits objects created in one applet package to access objects created in another applet package. Therefore, it prohibits any object created in the CPS package to access any object of the main package. It will be appreciated by the one with ordinary skills in the art that, in that situation, the personalization code cannot be executed and the personalization phase cannot be achieved properly.

According to actual Java Card rules, by default, the object instances created from one applet instance belong to this applet instance, meaning that the ownership of these objects is the one of the applet instance. As a consequence, the objects personalized by executing the personalization code included in the CPS object created from the CPS applet, have the same ownership as the one of the CPS applet. Since the CPS applet is in the CPS package, it follows that, if the CPS package would be removed, all the personalized objects that were created from the CPS object instance would be removed altogether. This effect is cumulated with the fact that, in that case, the main applet is not able to access objects owned by the CPS applet due to the firewall.

The method proposes a solution to overcome these limitations by changing not only the firewall context, but also the ownership of the CPS object created by the CPS applet contained in the CPS package.

Embodiments of the proposed method shall now be described with reference to FIG. 3.

Referring to FIG. 3, there is shown therein a composite block diagram and flow chart illustrating different tasks performed according to embodiments of the proposed method for Java Card application memory footprint optimization. The method basically relies on a pre-separation of the Java Card applet into a main package and a CPS package.

More specifically, the method comprises the following.

At 31*a*, there is loaded into the memory of a Java Card a main package 11 containing a main applet 12, which is intended to be installed on the card and personalized. In parallel, at 31*b*, a Card Personalization Specification (CPS) package 21, containing the CPS applet 25 within which the personalization code 13 required by the personalization of said main application is included is further loaded into the memory of the same Java Card. In FIG. 3, these steps of loading are illustrated by arrows 31*a* and 31*b*, respectively. In one example, the main package 11 can be loaded into the Read-Only Memory (ROM) of the Java Card and the CPS package can be loaded into the Non Volatile Memory (NVM) of said Java Card. This example is advantageous since, as will be described in further detailed below, the code of the CPS package can eventually be deleted, but it is not intended to limit the scope of the invention. In other examples, both packages can be loaded in respective memory space of the same physical memory.

The creation of the CPS object 32 by the CPS applet 25 in the CPS package 21 loaded on the memory of the card is illustrated by the arrow 33 in FIG. 3. It shall be noted that, the CPS object 32 has the ownership of the CPS applet 25 and the firewall context of the CPS package 21. This is so because the CPS object 32 has been created from the CPS applet instance 25 which, itself, was created from the CPS package 21. Once it has been created, the main applet 12 calls the CPS object to handle its personalization. This is possible since, as previously mentioned, the main package 11 and the CPS package 21 are associated (for instance through the appropriate use of Java Card Shareable Interface), and can thus share resources.

However, the personalization code 13 within the CPS object 32 cannot access the main applet 12. Indeed, as previously described with reference to FIG. 2, should the CPS object 32 try to access the main applet 12 as illustrated by the arrow 37, then it would be blocked by the firewall 41 as illustrated by the cross 24.

In order to circumvent this situation, the method then continues with the changing of the firewall context and of the ownership of the CPS object 32 as illustrated by the arrow 34. The ownership change can be for instance performed in the CPS applet before the CPS object is obtained by the main applet or in the main applet once the CPS object is obtained by said main applet. In both cases this change occurs before the execution of the personalization code hereafter mentioned.

In FIG. 3, the CPS object with changed firewall context and ownership is represented by block 32'. This change can be achieved, for instance, by executing one or more Application Programming Interface (API) that is/are dedicated to changing the firewall context and/or the ownership of an object within the Java Card. For instance, the firewall context can be changed by a first API, and the ownership can be changed by this first API, or by a second API distinct from said first API. In one example, this(these) API(s) can be provided, for instance, by the Java Card platform or can be created specifically.

The process then goes on with executing the personalization code, from the CPS object 32', to personalize the data objects of the main application 12 as illustrated by the arrow 35. It shall be noted that the CPS object 32' can access the main applet 12 for that purpose, because the firewall context change illustrated by the arrow 34 has occurred. In FIG. 3, main application 12 with personalized data objects is represented by block 12'.

After the personalization of the main applet is complete the ownership of the CPS object 32' is changed back to the CPS applet instance as illustrated by the arrow 39. In FIG. 3, the CPS object with ownership changed back to the CPS applet instance is represented by block 32".

Eventually, once the ownership of the CPS object has been changed back to the CPS applet, the CPS package 21 can be deleted as illustrated by the arrow 40. As a result, the personalization code is also deleted, since it is a part of CPS package code.

To summarize, embodiments of the method as described above allow to personalize a Java Card application while eventually removing all the code elements related to its personalization. Consequently, this advantageously provides memory footprint reduction for the main applet.

The method thus allows the personalization of an application created/installed from a package to be performed from the object created/installed from a different package. Further, the later package can be removed after the completion of the personalization process without removing any of the elements required by the main applet for its functioning.

The method is expected to allow reducing application memory footprint significantly and presents several additional advantages:

It is easy to implement in already existing applications;
In terms of card security it is no longer possible to execute "parasitic" personalization code to modify the application because the personalization code no longer exists;
The reduction of the memory space required for an application offers the possibility to use java cards with less memory hence cheaper products;
Reciprocally, it is possible to install more applications into the memory of a single java card thus increasing the productivity of a single card.

The present invention can also be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A method of reducing the memory footprint of a Java Card application, the method comprising:
    loading two distinct packages into the memory of a Java Card, namely a first, main package containing a main application and dedicated to the installation and transaction phase of said main application in the Java Card, and a second package, capable of sharing resources with the main package;
    using the second package during execution of the personalization phase of the main application;
    changing the firewall context of a personalization object of the second package by assigning thereto a firewall context of the main applet;
    changing the ownership of the personalization object from a personalization applet instance ownership to a main applet instance ownership;
    changing back the ownership of the personalization object from the main applet ownership to the personalization applet ownership; and
    deleting the second package after said execution of said main application.

2. The method of claim 1, wherein the main package and the second package use Java Card Shareable Interface to be capable of sharing resources with each other.

3. The method of claim 1, wherein the main package is associated to a transaction phase and the second package is associated to a personalization phase, respectively.

4. The method of claim 3, wherein the second package is a Card Personalization Specification (CPS) package and said personalization applet is a CPS applet dedicated to the creation of a CPS object into the memory of the Java Card.

5. The method of claim 4, wherein the CPS package has a firewall context and an ownership, and is configured to execute a personalization code used for the personalization of the main application.

6. The method of claim 1, further comprising handling the personalization of the main application by having the main application access the personalization object and execute the personalization code which initializes main application data.

7. The method of claim 1, wherein the firewall context of the CPS object is changed by a first Application Programming Interface, API.

8. The method of claim 7, wherein the first API and/or the second API used for changing the ownership and the firewall context of the personalization object is/are rendered unusable after having performed the change back of the personalization object ownership from the main applet to the personalization applet.

9. The method of claim 1, wherein the ownership of the personalization object is changed and/or changed back by the first API, or by a second API distinct from said first API.

10. The method of claim 7, wherein the first API and/or the second API, used for changing the ownership and/or the firewall context of the personalization object, respectively, are provided by the Java Card platform or are created specifically.

11. The method of claim 9 wherein the first API and/or the second API used for changing the ownership and the firewall context of the personalization object is/are deleted from the Java Card memory after the change back of the personalization object ownership from the main applet to the personalization applet has been performed.

12. The method of claim 1, wherein the firewall context of the personalization object is changed by implementing a specific parameter in the standard install command used to install the personalization applet and defined by the Global Platform Card specification.

13. The method of claim 1 wherein the main application installed from the main package is a Europay Mastercard Visa application.

14. The method of claim 1, wherein the main package is loaded into the Read-Only Memory of the Java Card.

15. The method of claim 1, wherein the personalization package is loaded into the Non-volatile Memory of the Java Card.

16. The method of claim 1, further comprising dividing the Java Card application into the main package and the second package.

17. A computer program product comprising:
    one or more stored sequences of instructions that are accessible to a processor and which, when executed by the processor, cause the processor to perform the step of:
        loading two distinct packages into the memory of a Java Card, namely a first, main package containing a main application and dedicated to the installation and transaction phase of said main application in the Java Card, and a second package, capable of sharing resources with the main package;

using the second package during execution of the personalization phase of the main application;

changing the firewall context of a personalization object of the second package by assigning thereto a firewall context of the main applet;

changing the ownership of the personalization object from a personalization applet instance ownership to a main applet instance ownership;

changing back the ownership of the personalization object from the main applet ownership to the personalization applet ownership; and deleting the second package after said execution of said main application.

18. A device for reducing the memory footprint of a Java Card Application, comprising a non-transitory memory containing instructions for:

loading two distinct packages into the memory of a Java Card, namely a first, main package containing a main application and dedicated to the installation and transaction phase of said main application in the Java Card, and a second package, capable of sharing resources with the main package;

using the second package during execution of the personalization phase of the main application;

changing the firewall context of a personalization object of the second package by assigning thereto a firewall context of the main applet;

changing the ownership of the personalization object from a personalization applet instance ownership to a main applet instance ownership;

changing back the ownership of the personalization object from the main applet ownership to the personalization applet ownership; and deleting the second package after said execution of said main application.

* * * * *